O. PIPER.
Shedding Mechanism.
No. 199,223. Patented Jan. 15, 1878.
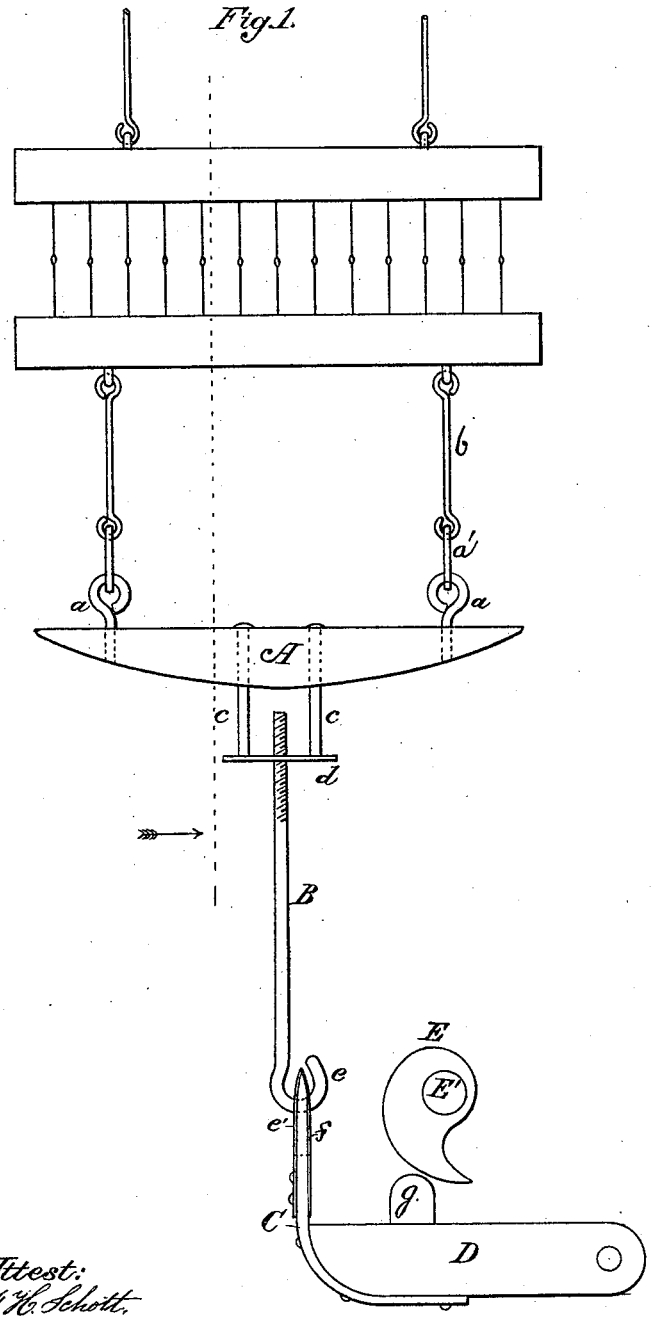
Attest:
H. H. Schott
Fred E. Tasker
Inventor:
Orin Piper
J. E. Tasker & Co. atty

UNITED STATES PATENT OFFICE.

ORIN PIPER, OF MANCHESTER, NEW HAMPSHIRE.

IMPROVEMENT IN SHEDDING MECHANISMS.

Specification forming part of Letters Patent No. 199,223, dated January 15, 1878; application filed November 13, 1877.

*To all whom it may concern:*

Be it known that I, ORIN PIPER, of the city of Manchester, in the county of Hillsborough and State of New Hampshire, have invented certain new and useful Improvements in the Mode of Operating the Jacks of Harnesses in Looms; and I do hereby declare that the following is a full, clear, and exact description thereof, which will enable others skilled in the art to which it appertains to make and use the same, reference being had to the accompanying drawings, and to letters of reference marked thereon, which form a part of this specification.

The object of this invention is to provide an efficient mechanism for operating the harness-jacks of common power-looms, and is designed to take the place of the leather straps heretofore commonly used for connecting the cam-lever and jack. This strap has been provided with a means of adjustment consisting of a series of holes, into which a hook attached to the jack enters. These holes, being necessarily at some little distance from each other, rendered a nice adjustment impossible; and, further, straps were soon worn out, owing to the strain upon them, which caused the hook to cut through from one hole to the next, rendering the loom useless until a new strap was substituted for the old one; and the invention consists in connecting the jack and cam-lever by means of the devices hereinafter fully described, and then specifically pointed out in the claim.

In the drawings, Figure 1 is a front or rear view of the connection attached to a jack and lever; and Fig. 2 is an end view, partly in section, of the same.

A represents the harness-jack, provided with the eyebolts $a$ and plates $a'$, to which are attached the hooked rods $b$, by means of which the connection between the jack and harness is made. Passing through the jack at suitable distances from its center are the two bolts $c$ $c$, which carry upon their lower ends the plate $d$, through a screw-threaded central orifice in which passes the screw-threaded end of the connection B. The lower end of this connection is provided with a hook, $e$, that is attached to the strap C by passing through an elongated slot, $e'$, in its upper extremity. This strap C is commonly of leather, having its upper end protected from abrasion by a metallic sheathing, $f$, that covers its sides nearly down to the point of its attachment to the cam-lever D. This lever is provided with an upright projection, $g$, on its upper side, and is pivoted at the end opposite to that to which the strap is attached. Upon this projection $g$ the cam E strikes as it rotates with the cam-shaft E'.

It will be evident that the strap C may be made wholly of metal, if desired; and it may be secured to the under side of the lever by means of screws instead of rivets, if desired.

The operation of this device is as follows: The connecting-rod B has its hook $e$ inserted in the slot $e'$ of the metal-covered strap C, its upper threaded end passing through the plate $d$, and, when in use, standing vertically. In order to release the hook for the purpose of shortening or lengthening the connection, the hooks and straps by which each harness is attached to its fellow are detached from their fastenings, when the harness will drop down, carrying the cam or operating levers with it. Now lift the lever with one hand, and with the other pull down the hook $e$, which will detach it from the slot in the strap. After being so released, the hook and rod are turned to the right or left, as it is desired to shorten or lengthen the connection, until the position is reached which will give the harness its proper gage. Then replace the hook in the slot, let go the lever, and secure the top hooks and straps in their proper position, as before the parts were disturbed.

Having thus described my invention, I claim as new, and desire to secure by Letters Patent of the United States, the following:

The jack A, provided with the suspension-rods $c$ $c$ and screw-threaded plate $d$, in combination with the hooked and screw-threaded connection-rod B, slotted strap, and cam-lever D, as and for the purpose specified.

In testimony that I claim the foregoing as of my own invention I affix my signature in presence of two witnesses.

ORIN PIPER.

Witnesses:
 JAMES E. DODGE,
 B. P. CILLEY.